(12) United States Patent
Tadano et al.

(10) Patent No.: US 6,542,090 B1
(45) Date of Patent: Apr. 1, 2003

(54) CHARACTER INPUT APPARATUS AND METHOD, AND A RECORDING MEDIUM

(75) Inventors: Masayoshi Tadano, Tama (JP); Osamu Adachi, Tokyo (JP); Fujimura Takeshi, Yokohama (JP); Toshiaki Kikka, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/417,970

(22) Filed: Oct. 13, 1999

(51) Int. Cl.[7] ............................................. H03K 17/94
(52) U.S. Cl. ........................... 341/20; 341/22; 704/426; 707/535
(58) Field of Search ...................... 341/20, 22; 707/530, 707/535, 536; 704/246

(56) References Cited

U.S. PATENT DOCUMENTS 6,073,146 A * 6/2000 Chen ........................... 707/535

* cited by examiner

Primary Examiner—Timothy Edwards, Jr.
(74) Attorney, Agent, or Firm—Merchant & Gould, P.C.; John E. Whitaker

(57) ABSTRACT

A character input apparatus and method which can give a plurality of different character input mean a capability of complementing each other.

18 Claims, 6 Drawing Sheets

CHARACTER INPUT APPARATUS AND METHOD, AND A RECORDING MEDIUM

TECHNICAL FIELD PERTINENT TO THE INVENTION

The present invention relates to a character input apparatus and method that uses a plurality of character input means, such as keyboard and voice input device, for word processing and for inputting Japanese and English characters. This invention also relates to a recording medium.

BACKGROUND OF THE INVENTION

In general purpose computers such as personal computers and workstations, character input is made using a keyboard.

In recent years, it has become possible to enter handwritten characters using a mouse and to use voice for entering characters.

The character input procedure normally involves inputting characters representing the pronunciation such as in Japanese hiragana by a keyboard and converting the hiragana into Chinese kanji and, for kanji whose pronunciation is not known to the user, a handwritten character is used to enter that kanji. In this way, the character inputting is becoming easy for the user.

With the character input apparatus of this kind, however, when character input devices with different input methods, such as keyboard, voice input device and handwritten character input device, are used in combination, each input device needs to finalize the input character. For example, when a word " 東京(Tokyo)" n a character string of " 東京駅(Tokyo station)" is entered by a keyboard and a word "駅(station)" is entered by using a handwritten character input device, the user performs the following operation. First, the user enters "とうきょう(Tokyo)" in Japanese hiragana from the keyboard and presses a kanji conversion key, which causes a plurality of possible kanji candidates to be displayed. Then the user selects " 東京" to which he or she wants the entered hiragana to be converted.

Next, by using the handwritten character input device, the user enters a character pattern of "駅" with a mouse. In this case too, possible kanji candidates are displayed and the user selects a desired one.

With this kind of a character input apparatus, input characters conventionally are finalized by each of a keyboard, a handwritten character input device and a speech recognition device, and a string of the finalized characters is handed over to word processing software. Hence, when for example a particular character key on the keyboard should become unusable, the handwritten character input device cannot be used Instead of the character key. For example, in the case of "とうきょうえき(Tokyo Station)" described above, when "と(denoted "TO"In romanized alphabet)" cannot be entered from the corresponding key and is entered from the handwritten character input device, the character input apparatus handles "と" as a finalized character and cannot use it as an unfinalized character that can be converted into kanji.

When two or more character strings are entered through different character input means, final characters must be selected from among candidate converted characters for each input means, which makes the user operation complicated.

DESCRIPTION OF REFERENCE NUMERALS

Figure 1:
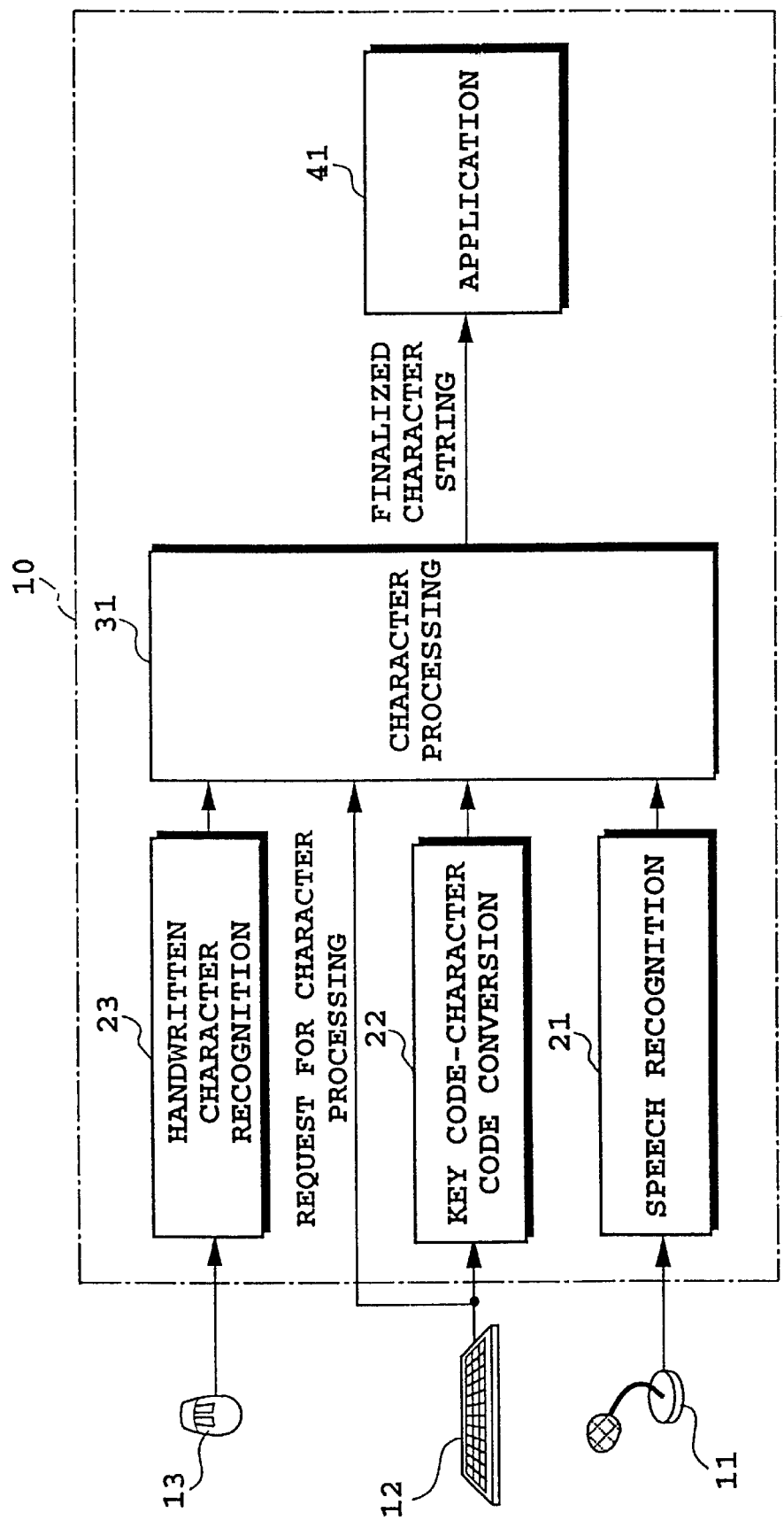
FIG. 1 is a block diagram showing a basic configuration of an embodiment according to the invention.

11: Microphone;
12: Keyboard;
13: Mouse;
101: CPU;
102: System memory;
103–107: (Input/output) interface;
108: Hard disk.

SUMMARY OF THE INVENTION

It is therefore an object of the invention to provide a character input apparatus and method which can give a plurality of different character input means a capability of complementing each other.

To achieve this objective, the invention according to claim 1 is characterized by a character input apparatus which comprises: a plurality of character input means with different character input methods; memory means for storing characters in the order that they are entered from the plurality of the character input means; and character processing means for processing the stored character string to finalize the input character string.

The invention according to claim 2 is characterized by a character input apparatus according to claim 1, which further comprises character processing range specifying means for specifying a range of the character string on the memory means for the character processing by the character processing means.

The invention according to claim 3 is characterized by a character input apparatus according to claim 1, which further comprises display means for displaying the character string stored in the memory means and the character string finalized by the character processing means in different display forms.

The invention according to claim 4 is characterized by a character input apparatus according to claim 1, wherein the character processing performed by the character processing means includes processing for converting from kana into kanji an unfinalized character string entered by the plurality of character input means.

The invention according to claim 5 is characterized by a character input apparatus according to claim 1, wherein the character processing performed by the character processing means is either an insertion or a deletion of characters.

The invention according to claim 6 is characterized by a character input apparatus according to claim 1, wherein the character processing performed by the character processing means is a conversion of a character kind.

The invention according to claim 7 is characterized by a character input method which comprises: an input step for inputting characters by different methods; a storage step for storing the characters entered by different methods in a memory device in the order that they are entered; and a character processing step for processing the stored character string to finalize the input character string.

The invention according to claim 8 is characterized by a character input method according to claim 7, which further comprises a character processing range specifying step for specifying a range of the character string on the memory device for the character processing by the character processing step.

The invention according to claim 9 is characterized by a character input method according to claim 7, which further comprises a display step for displaying the character string stored in the memory device and the character string finalized by the character processing step in different display forms.

The invention according to claim 10 is characterized by a character input method according to claim 7, wherein the character processing performed by the character processing step includes processing for converting from kana into kanji an unfinalized character string entered by the input step.

The invention according to claim 11 is characterized by a character input method according to claim 7, wherein the character processing performed by the character processing step is either an insertion or a deletion of characters.

The invention according to claim 12 is characterized by a character input method according to claim 7, wherein the character processing performed by the character processing step is a conversion of a character kind.

The invention according to claim 13 is characterized by a recording medium storing a program executed by a computer in a character input apparatus, which processes an input character string and outputs a finalized character string, the recording medium being characterized in that the program includes: an input step for inputting characters by different methods; a storage step for storing the characters entered by different methods in a memory device in the character input apparatus in the order that they are entered; and a character processing step for processing the stored character string to finalize the input character string.

The invention according to claim 14 is characterized by a recording medium according to claim 13, wherein the program further comprises a character processing range specifying step for specifying a range of the character string on the memory device for the character processing by the character processing step.

The invention according to claim 15 is characterized by a recording medium according to claim 13, wherein the program further comprises a display step for displaying the character string stored in the memory device and the character string finalized by the character processing step in different display forms.

The invention according to claim 16 is characterized by a recording medium according to claim 13, wherein the character processing performed by the character processing step includes processing for converting from kana into kanji an unfinalized character string entered by the input step.

The invention according to claim 17 is characterized by a recording medium according to claim 13, wherein the character processing performed by the character processing step is either an insertion or a deletion of characters.

The invention according to claim 18 is characterized by a recording medium according to claim 13, wherein the character processing performed by the character processing step is a conversion of a character kind.

DETAILED DESCRIPTION OF THE INVENTION

Now, an embodiment of the invention will be described in detail by referring to the accompanying drawings.

FIG. 1 shows a basic configuration of an example embodiment of the invention. A general purpose computer 10 includes a known speech recognition program 21 for realizing a speech recognition device, a key code-character code conversion program 22, a handwritten character recognition program, a character processing program 31 for the invention, and an application 41 that uses character strings that are finalized from inputs by character processing.

The character processing as described In this embodiment means processing performed to obtain a string of characters finalized from an input character string entered from a character input means described later and includes a kana-kanji conversion (including selection of words with the same pronunciation and different meanings), a character kind conversion among hiragana, katakana and alphabet, and an insertion, a deletion of characters and such a like.

The general purpose computer 10 has a microphone 11, a keyboard 12 and a mouse 13 as part of the character input means with the microphone 11 used for inputting voice and the keyboard 12 used for inputting hiragana, katakana and alphabet. In this embodiment, the kind and execution of character processing are specified from the keyboard 12. The mouse 13 is manipulated to enter a script pattern. Based on information input from these input means, the program described above generates a character code by performing the character recognition or key code conversion processing.

The feature of this embodiment is that characters, entered from the plurality of the character input means (input device+recognition (conversion) program) and converted, are treated not as finalized characters but as unfinalized characters that can undergo the character processing for finalization.

Figure 2:
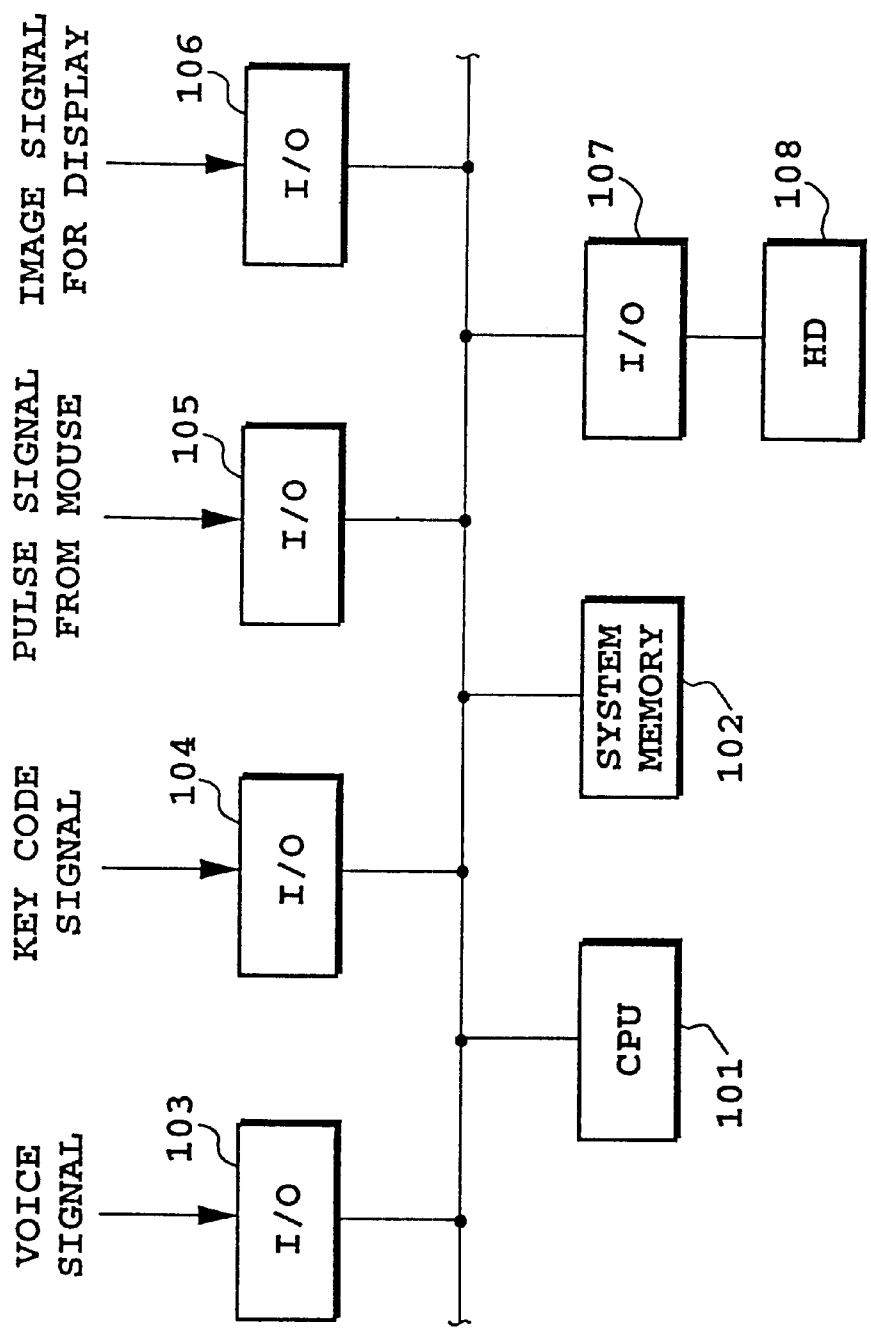
FIG. 2 is a block diagram showing an example system configuration of an embodiment of the invention.

An example configuration of the general purpose computer 10 that has the basic configuration described above is shown in FIG. 2. In FIG. 2, reference number 101 represents a CPU that executes a program described later to perform the character processing according to the invention. Denoted 102 is a system memory that temporarily stores a program executed by the CPU 101 and input/output data used for calculations carried out by the CPU 101. Designated 103 is, an input interface that receives an analog voice signal and converts it into a digital voice signal. An input interface 104 receives and temporarily holds a key code signal (identification signal that the user has assigned to a depressed key) output from the keyboard 12.

Denoted 105 is an input interface that receives a pulse signal produced as the mouse 13 is moved and a pulse signal generated as a result of operation of a click button of the mouse 13. Denoted 106 is an output interface that outputs an image signal to a display. The image signal is created in the system memory 102 and is read out by the CPU 101 (or a direct memory access controller) for output to a display not shown through the output interface 106.

Designated 107 is an interface for connecting the CPU 101 and a hard disk (HD) 108. The hard disk 108 stores an operating system (OS) for controlling the constitutional elements described above, various kinds of data used for system control, the speech recognition program 21, the key code character code conversion program 22, the handwritten character recognition program 23, the character processing program 31 and various application programs such as word processing software. The character processing program and other programs of this invention may be installed in the hard disk 108 through a portable recording medium such as CDROM and floppy disk.

By referring to FIGS. 3 and 4, the character processing according to this invention will be described. A kanji conversion processing is taken up as an example.

Figure 3:
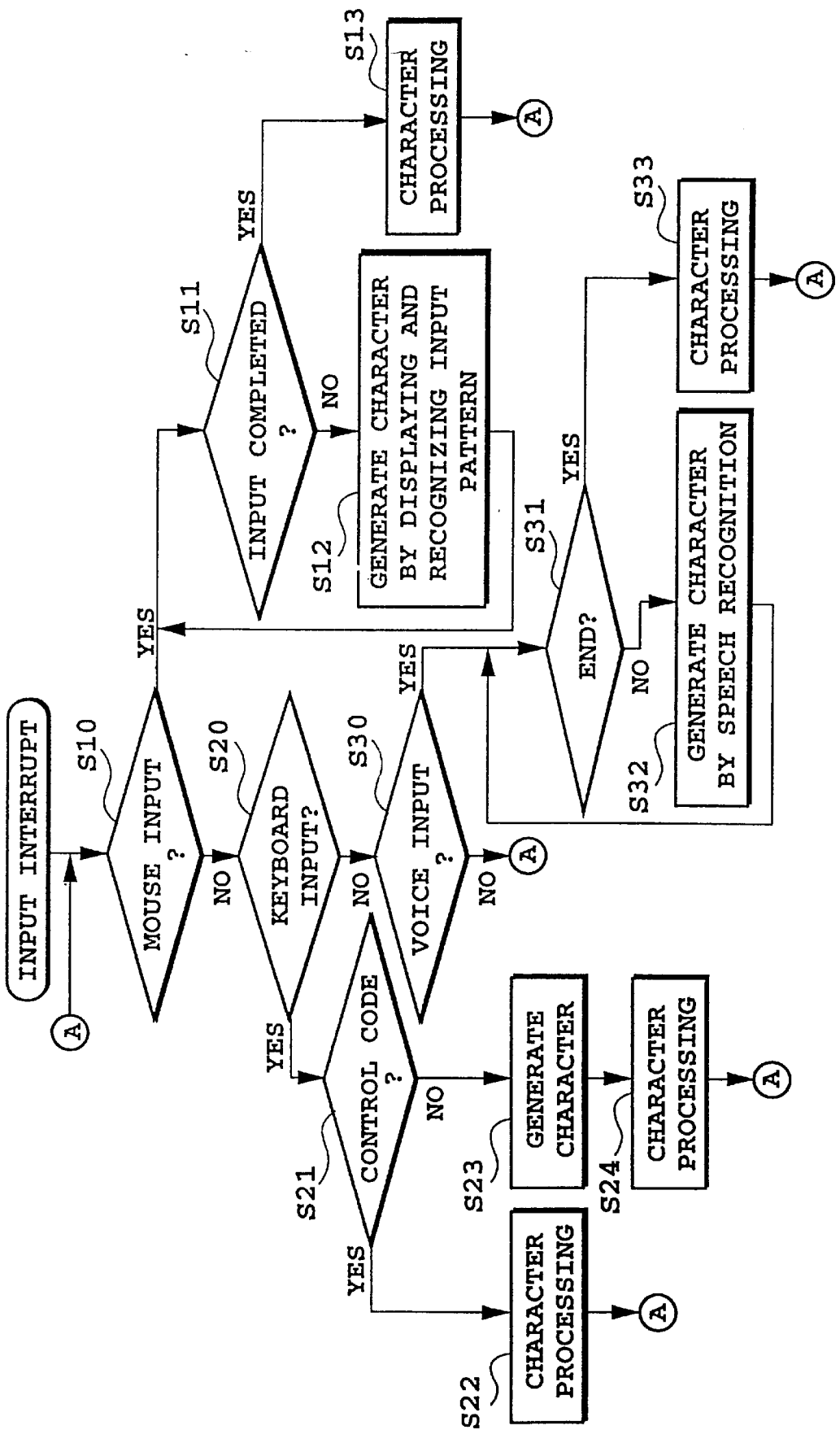
FIG. 3 a flow chart showing the processing procedure executed by the CPU 101 in an embodiment of the invention.
Figure 4:
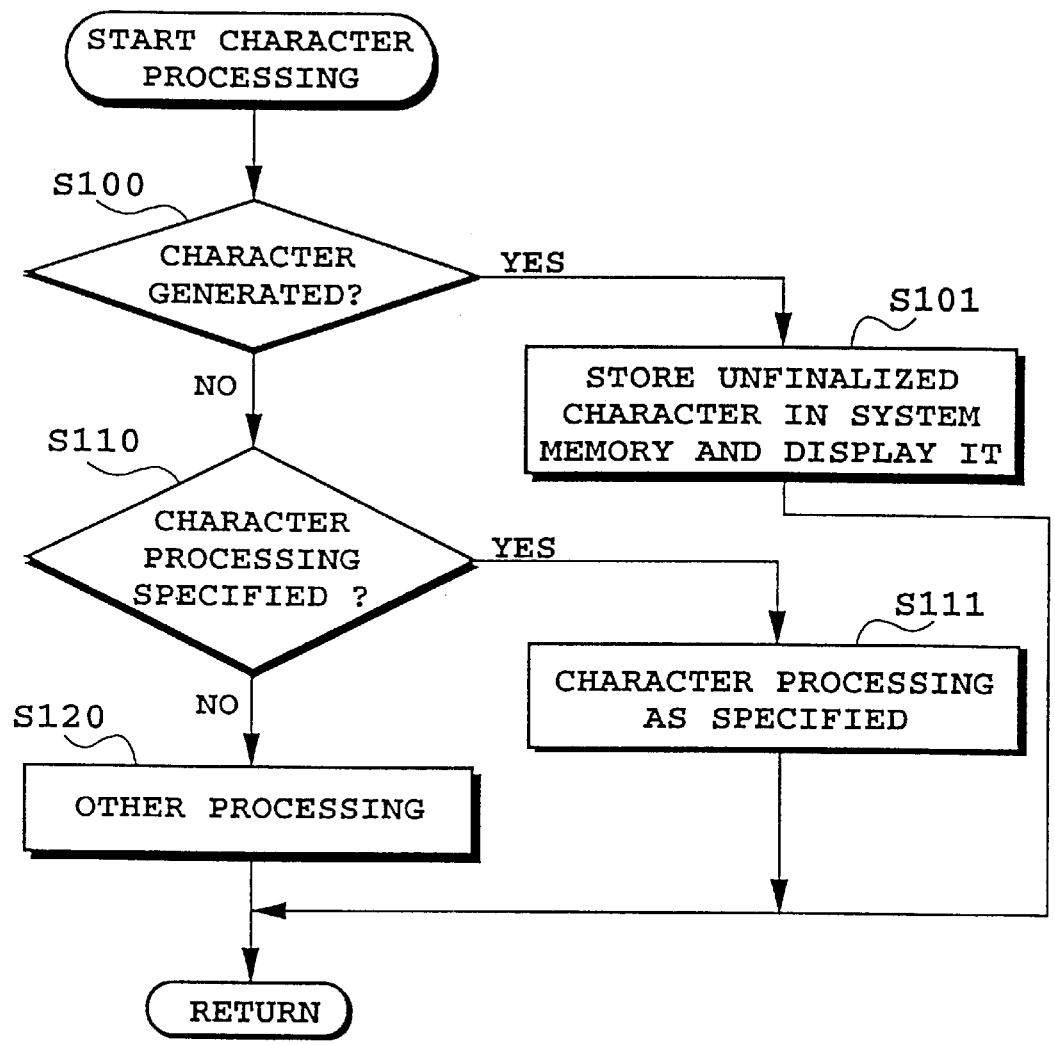
FIG. 4 is a flow chart showing a detailed procedure of the character processing of FIG. 3.

The character processing program of FIGS. 3 and 4 is started when a character input is required during the execution of an application program, and is read in a predetermined cycle from the system memory 102 and executed by the CPU 101.

Figure 5:
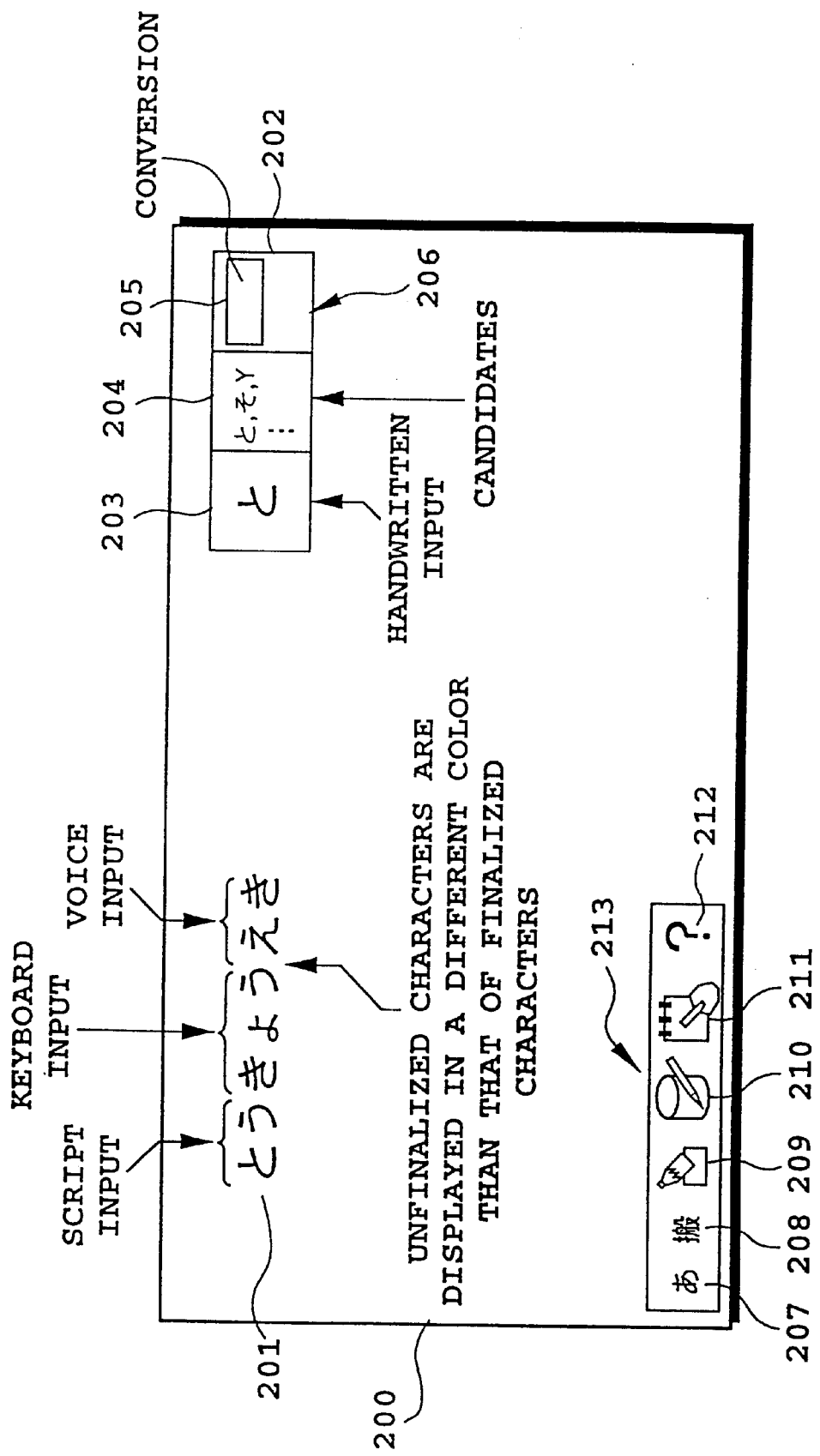
FIG. 5 is an explanatory view showing an example display produced by the character processing.

An operator, while watching a displayed screen of the display, enters characters interactively. An example of display contents is shown in FIG. 5 and the display process associated with the character input will be briefly explained. In FIG. 5, denoted 200 is a document generation window. Shown at 201 is a string of input characters that are either unfinalized or finalized. Unfinalized characters and finalized characters are displayed in different colors. Designated 206 is a script input window that has a handwritten character input field 203, a candidate display field 204 and a conversion request button 205.

Designated 213 is a window for specifying the character processing and has the following icons (request buttons). Shown at 207 is an icon for specifying the kind of input character. Clicking this icon with a mouse 13 displays a pop-up menu that allows the operator to select the kind of characters, such as full-size hiragana, full-size katakana, full-size alphanumeric and half-size alphanumeric. Input characters are displayed in the character kind selected in this menu by the mouse 13.

Denoted 208 is an icon for selecting a dictionary to be used for the kana-kanji conversion. An icon 209 is used to start/stop the handwritten character recognition program. When the icon 209 is specified by the mouse 13 to display a pop-up menu and a handwritten character input mode in the pop-up menu is selected, the handwritten character recognition program is started and the script input window 206 is displayed. An icon 210 is used to register words with a dictionary. An icon 211 is used to make various settings associated with character processing. Denoted 212 is an icon for invoking a so-called help function.

It is assumed that, before inputting characters, the user has selected a hiragana input mode and a handwritten character input mode in the window 213. Under this condition, the user puts the cursor of the mouse 13 on the handwritten character input field 203 and manipulates the mouse 13 to enter a character pattern of "と". This operation causes a pulse signal representing the amount of mouse movement to be Input to the CPU 101 The CPU 101 at step 10 detects that the pulse signal of the mouse 13 has entered into the input interface 106, and counts the input pulses and converts the counted result into a coordinate position of the mouse cursor. The CPU 101 then writes a black dot at a position within the character input field 203 on the screen that corresponds to the determined coordinate position (step S10 to S11 to S12 in FIG. 3). By performing the loop processing of the steps S11–S12, the CPU 101 acquires the character pattern that the user has input using the mouse 13 (coordinate positions of line segments making up the character) and stores it in the system memory 102. While the mouse 13 continues to be manipulated within the character input field 203, the CPU 101 performs character recognition each time a line segment forming the character is entered and displays character candidates in the candidate display field 204.

After finishing the input of a character pattern, the user selects one of the characters displayed in the candidate display field 204 that the user wants to input and presses the conversion button 205. When this operation is detected by step S11, the CPU 101 decides that the character pattern input has ended and hands a character code corresponding to the selected character over to the character processing of step S13. The detailed procedure of the character processing is shown in FIG. 5.

In FIG. 5, when the conversion of a key code from the, keyboard, the handwritten character recognition program 23 or the speech recognition program 21 (in this case, the handwritten character recognition program 23) generates a character code that is handled as an input (YES decision at step S100 in FIG. 4), the generated character code is stored in a dedicated area in the system memory 102 (referred to as an input buffer). Attribute information representing the means that generated the character is also stored. It should be noted here that characters stored in the input buffer are all handled as unfinalized characters whatever the kind of the character input means. Hence the characters stored in the input buffer is displayed in a color different from that of finalized characters on the display (Step S100 to S101 in FIG. 4).

Then, when the user Inputs a character pattern "う" by using the character input field 203 (see FIG. 5), the similar processing to that described above is performed by the CPU 101, storing a character code of "う" and an identification code of the character input means in the input buffer and displaying a character "う" on the screen of the display.

Next, when the user enters "き" using the keyboard 12 the CPU 101 at step S20 of FIG. 3 detects the input from the keyboard 12, checks that the key code entered from the keyboard 12 is not a control code specifying the kind of character processing, and then converts the key code into a character code of "き" by the key code character code conversion program 22 (step S10 to S20 to S21 to S23 in FIG. 3). After this, the procedure moves to a character processing procedure of FIG. 4, which stores the character code generated by the key code-character code conversion program 22 and its identification information into the input buffer and displays the character in the unfinalized character color on the screen (step S100 to S101 in FIG. 4).

The user then presses keys "よ" and "う" and the procedure described above is repeated, storing character codes corresponding to "よ" and "う" into the input buffer and displaying them in the unfinalized character color.

When the user pronounces "えき" using the microphone 11 the CPU 101 at step S30 of FIG. 3 detects the input from the microphone 11, stores an input voice signal into the system memory 102 and performs speech recognition by the speech recognition program 21. In this embodiment, a speech recognition program that handles continuous voice, such as a speech recognition program using a hidden Markov model, is used to perform speech recognition at a level of voice element (time unit shorter than phoneme) to acquire a string of phonemic character codes. The phonemic character code string is converted into a code string of a prespecified character kind, in this embodiment a hiragana character code string (the loop processing of step S31–S32 in FIG. 3). Having detected the absence of input voice signal and decided that the voice-activated character input is finished at step S31, the CPU 101 proceeds to step 33, i.e. the character processing procedure of FIG. 4, where it stores the character code string generated by the voice recognition program 21 into the input buffer and displays the characters in the unfinalized character color on the screen (step S100 to S101 in FIG. 4).

After having input unfinalized characters for conversion processing (which in this case also represents the pronunciation of the kanji into which the input characters are to be converted), the user performs the key operations described below to specify the character processing. The correspondence between the key operations and the contents displayed is shown in FIG. 6.

The processing of finalizing the character codes stored in the input buffer is similar to the conventional processing performed on character codes entered from a single character input means. Thus, the processing will be explained only briefly.

Figure 6:
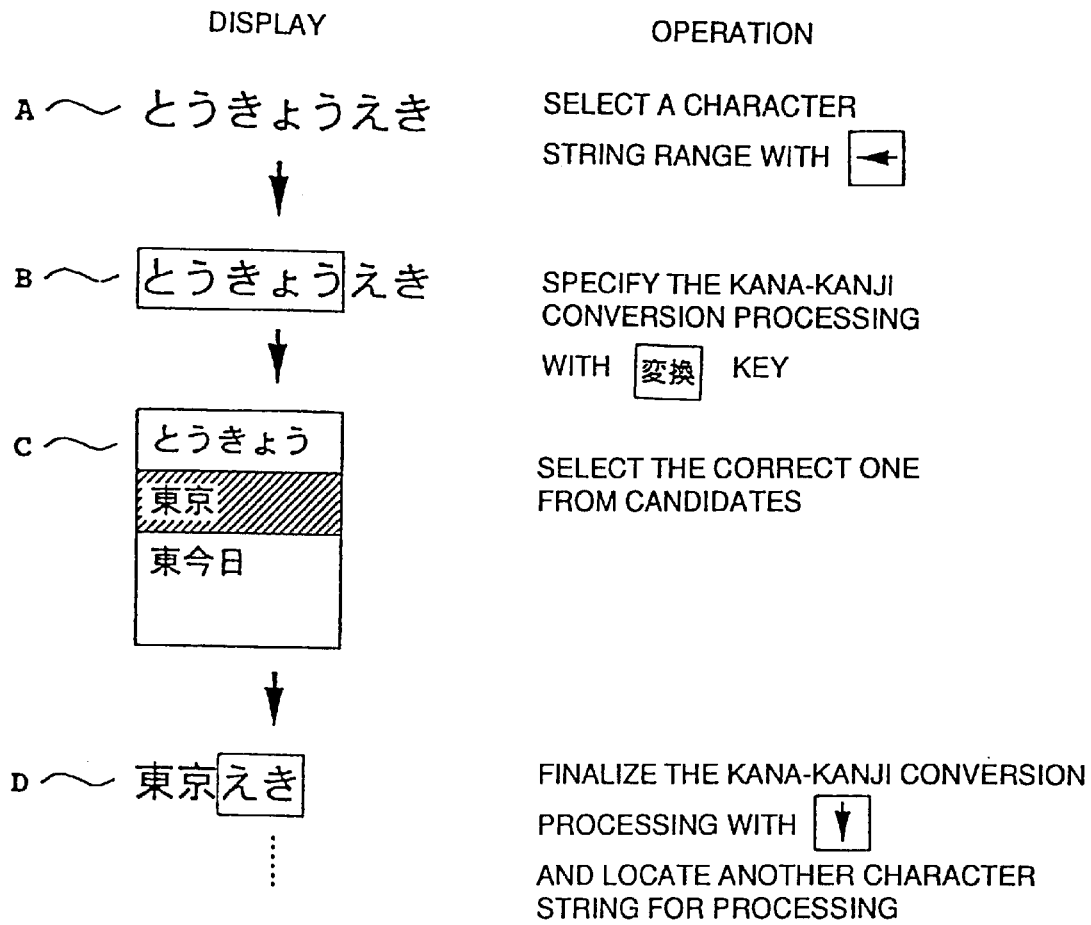
FIG. 6 is an explanatory view showing display changes that occur as unfinalized characters are finalized and operations performed by a user.

In the present state a character string of "とうきょうえき" entered from a plurality of character input means is stored in the input buffer and displayed as shown at A in FIG. 6. Here each time a left arrow (←) key on the keyboard 12 is depressed, the character string range for processing (right end) shifts left by one character from the present position "き". When it is desired to expand the character string range for processing, a right arrow (→) key should be pressed.

In this way, the user specifies the character string of "とうきょう" as the range for processing (see symbol B in To emphasize the character string being FIG. 6). To emphasize the character string being specified for the processing, this embodiment changes the background color for the displayed characters.

Next, the user operates a dedicated key (or shortcut keys (simultaneous operation of a plurality of character keys)) to specify the kind of character processing and its execution. When the kana-kanji conversion is to be specified, for example, a conversion key or a space key is operated. For conversion from hiragana to katakana, an F7 function key is operated. Conversion into alphanumeric is carried out by depressing an F9 function key. For deletion of characters, a delete key is used. These are examples using a JIS (Japanese Industrial Standards) 106-keyboard, and appropriate keys need only to be allocated according to the kind of keyboard.

When, after the range of characters is specified for processing in this manner, the conversion key is pressed, the kana-kanji conversion processing is performed. In more concrete terms, with the range-specified character string used as a pronunciation, a dictionary (dictionary containing pronunciations and their corresponding kana and kanji) is referenced. When there are words having the same pronunciation but different meanings, candidates are displayed as shown at C in FIG. 6. The user selects "東京" by using the mouse 13 or arrow key of the keyboard 12, as shown at reference numeral 6 in FIG. 6.

According to the selection mode the CPU 101 converts the unfinalized character string "とうきょう" that was specified for processing into a finalized character string "東京" and displays the finalized character string in a color which indicates that the character string of interest is a finalized one. The character processing range then moves to the remaining character string "えき". The user may change the character processing range if necessary. For the specified character processing range, the user specifies the kind of character processing as by a dedicated key, which causes the CPU 101 to perform the specified character processing in a manner similar to the conventional one.

This sequential processing is performed by following the path of steps S10 to S20 to S21 to S22 of FIG. 3 and to S100 to S110 to S111 of FIG. 4 For the insertion of unfinalized characters, the characters the user wants inserted may be accepted from the keyboard 102 after specifying the character insertion position.

As described above, in this embodiment characters entered from a plurality of character input means with different input methods are stored in the system memory 102 as unfinalized characters in the order that they are entered, and the processing of the unfinalized characters is executed either in one whole block or in two or more blocks by specifying the character processing range. This frees the user from the conventional complicated operation procedure that requires the character finalization processing to be executed for each of the different character input means. Further, even when a particular character key on the keyboard should fail, the script input or voice input can be substituted for the failed character key.

In addition to the embodiment described above, the following embodiment may be implemented.

1) Although the above embodiment has been shown to have a key input means, a handwritten character input means and a voice-activated character input means, it is possible to perform so-called OCR processing which recognizes characters from images read by a scanner and to generate unfinalized character strings. It is also possible to handle as unfinalized character strings the input character strings including those read from a recording medium inserted in a general purpose computer such as a CDROM, those entered from another apparatus through a communication channel, and those entered from a virtual keyboard displayed on a screen.

Further, the processing for converting small letters of alphabet into capital letters or converting a character string representing a symbol into that symbol and the spell check processing can be performed as the character processing. For character conversion, a conversion table containing character strings before and after conversion needs to be used. For spell checking, a table or so-called list of errata that shows erroneous input character strings and correctly spelled character strings is used.

2) While the kana-kanji conversion and the character kind conversion have been described as examples of character processing, it is possible to reverse-convert handwritten kanji into hiragana that represents the pronunciation of that kanji. In this case, a key for the reverse conversion is provided and when the reverse conversion is demanded from this key, the dictionary is searched through reversely (by referencing the kana-kanji portion) to obtain the pronunciation of the kanji.

3) Although the embodiment has been shown to attach identification information of the character input means to the unfinalized characters that were entered by that character input means, when the kind of the character input means is not identified, the identification information does not need to be attached to the unfinalized characters.

4) As to handwritten characters, the embodiment has been shown to select a character to be input as an unfinalized character from among a plurality of candidate characters during the handwritten character recognition processing. It is possible to automatically select one of the candidate characters produced by the character recognition processing which most resembles the handwritten character.

5) In the case where an input handwritten character is kanji, followed by hiragana entered from the keyboard 12, and a character string consisting of mixed kanji and hiragana is specified for the kanji conversion, the kanji portion may be handled as finalized characters. Further, for the kanji portion, it is also possible to display again as character candidates the plurality of candidates that were used for the script recognition. In converting the character string entered by speech into kanji, a plurality of character candidates are displayed which are used for character finalization in the speech recognition.

6) Although the embodiment has been shown to display an entered unfinalized character string and a finalized character string in different colors for distinction, it is possible to use other methods of notation, such as underlining the unfinalized character string and not underlining the finalized character string.

7) While the embodiment has been shown to enter kana characters from the keyboard 12, it is of course possible to enter romanized character from the keyboard.

In the invention as set forth in claims 1, 7 and 13, a character string entered from a plurality of different character input means can be finalized by the character processing similar to the one that is performed when the character string is entered by a single character input means as in the conventional apparatus. A user does not have to perform character finalization for each of the different character input means, which in turn reduces workload associated with the character finalization. Further, when a particular character processing means should fail, other character input means can be substituted to input characters.

In the invention as set forth in claims 2, 8 and 14, because any of the entered character strings can be selected by the user for processing, the user does not need to worry about input errors and can improve the character input speed.

In the invention as set forth in claims 3, 9 and 15, because the user can distinguish between an unfinalized character string and a finalized character string, the procedure for specifying the character processing range can be facilitated and made reliable.

In the invention as set forth in claims 4–6, claims 10–12 and claims 16–18, a variety of character processing, such as kanji conversion, character kind conversion, insertion and deletion, can be performed, which in turn allows erroneous input characters to be completely corrected before being finalized.

What is claimed is:

1. A character input apparatus comprising:
   a plurality of character input means with different character input methods;
   memory means for storing characters in the order that they are entered from the plurality of the character input means; and
   character processing means for processing the stored character string to finalize the input character string.

2. A character input apparatus according to claim 1, further comprising character processing range specifying means for specifying a range of the character string on the memory means for the character processing by the character processing means.

3. A character input apparatus according to claim 1, further comprising display means for displaying the character string stored in the memory means and the character string finalized by the character processing means in different display forms.

4. A character input apparatus according to claim 1, wherein the character processing performed by the character processing means includes processing for converting from kana into kanji an unfinalized character string entered by the plurality of character input means.

5. A character input apparatus according to claim 1, wherein the character processing performed by the character processing means is either an insertion or a deletion of characters.

6. A character input apparatus according to claim 1, wherein the character processing performed by the character processing means is a conversion of a character kind.

7. A character input method comprising:
   an input step for inputting characters by different methods;
   a storage step for storing the characters entered by different methods in a memory device in the order that they are entered; and
   a character processing step for processing the stored character string to finalize the input character string.

8. A character input method according to claim 7, further comprising a character processing range specifying step for specifying a range of the character string on the memory device for the character processing by the character processing step.

9. A character input method according to claim 7, further comprising a display step for displaying the character string stored in the memory device and the character string finalized by the character processing step in different display forms.

10. A character input method according to claim 7, wherein the character processing performed by the character processing step includes processing for converting from kana into kanji an unfinalized character string entered by the input step.

11. A character input method according to claim 7, wherein the character processing performed by the character processing step is either an insertion or a deletion of characters.

12. A character input method according to claim 7 wherein the character processing performed by the character processing step is a conversion of a character kind.

13. A recording medium storing a program executed by a computer in a character input apparatus, which processes an input character string and outputs a finalized character string, the recording medium characterized in that the program includes:
   an input step for inputting characters by different methods; a storage step for storing the characters entered by different methods in a memory device in the character input apparatus in the order that they are entered; and a character processing step for processing the stored character string to finalize the input character string.

14. A recording medium according to claim 13, wherein the program further comprises a character processing range specifying step for specifying a range of the character string on the memory device for the character processing by the character processing step.

15. A recording medium according to claim 13, wherein the program further comprises a display step for displaying the character string stored in the memory device and the character string finalized by the character processing step in different display forms.

16. A recording medium according to claim 13, wherein the character processing performed by the character processing step includes processing for converting from kana into kanji an unfinalized character string entered by the input step.

17. A recording medium according to claim 13, wherein the character processing performed by the character processing step is either an insertion or a deletion of characters.

18. A recording medium according to claim 13, wherein the character processing performed by the character processing step is a conversion of a character kind.

* * * * *